Figure 1B:
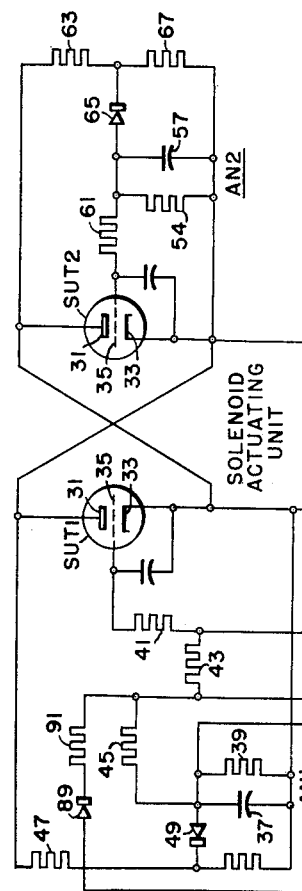
Figure 1B:
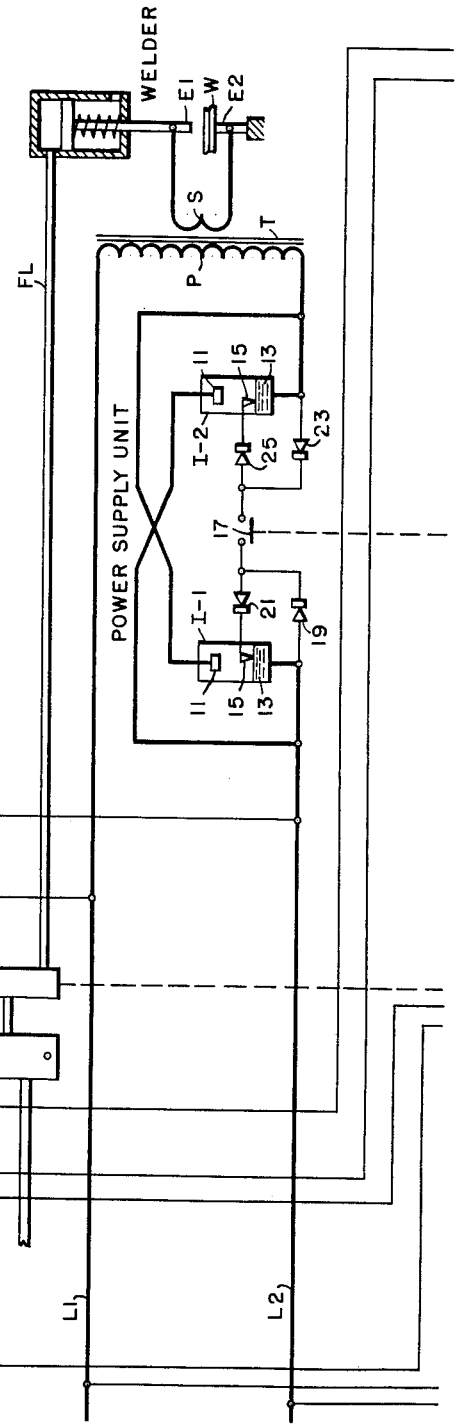

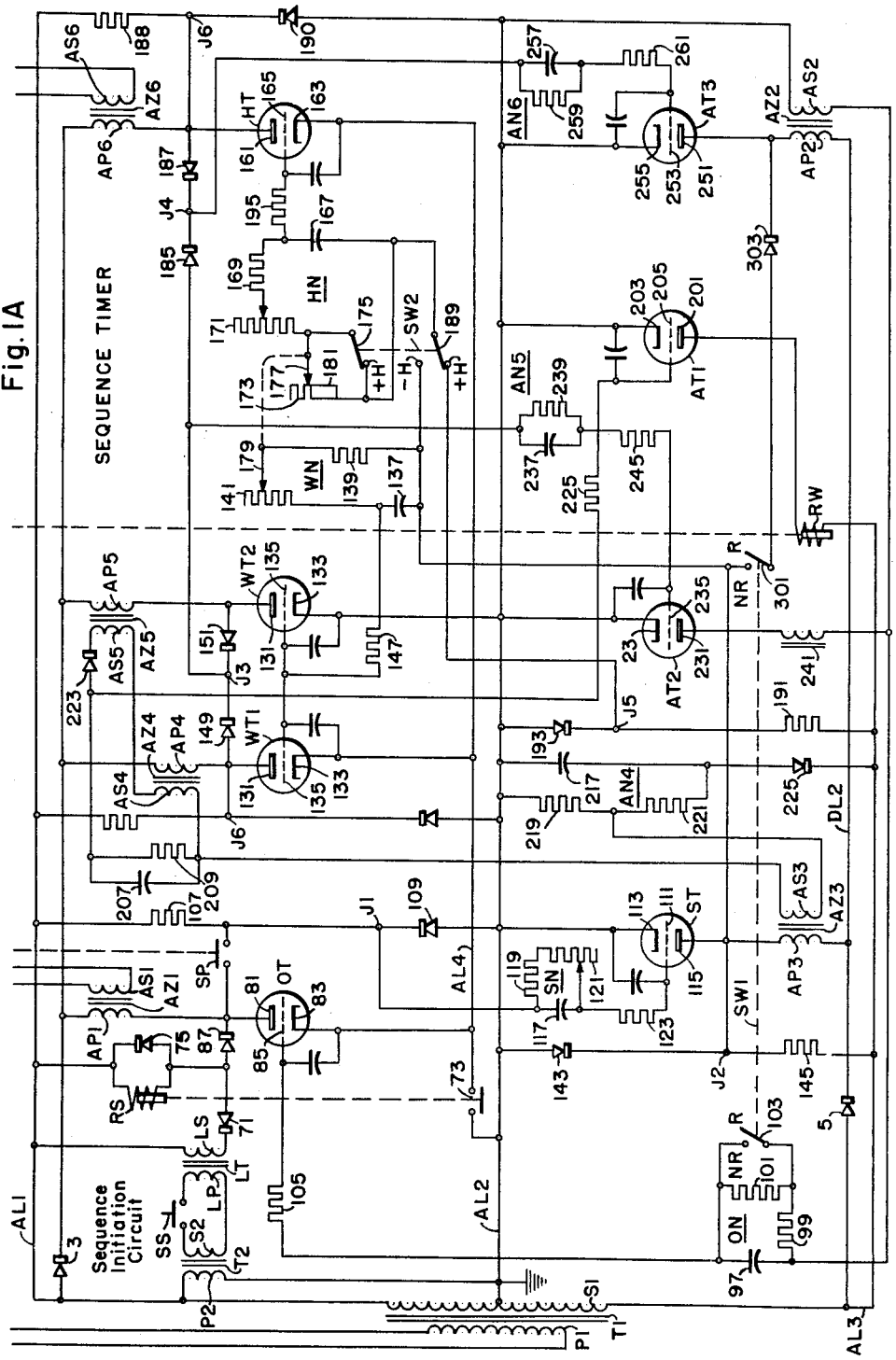

March 28, 1961 H. W. VAN NESS ET AL 2,977,529
ELECTRIC DISCHARGE APPARATUS
Original Filed Feb. 28, 1955 3 Sheets-Sheet 3
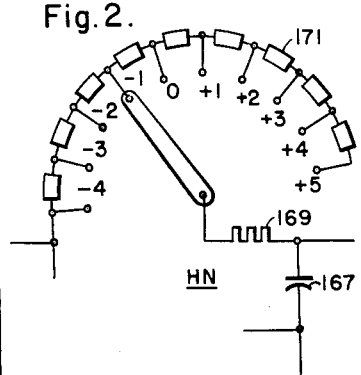
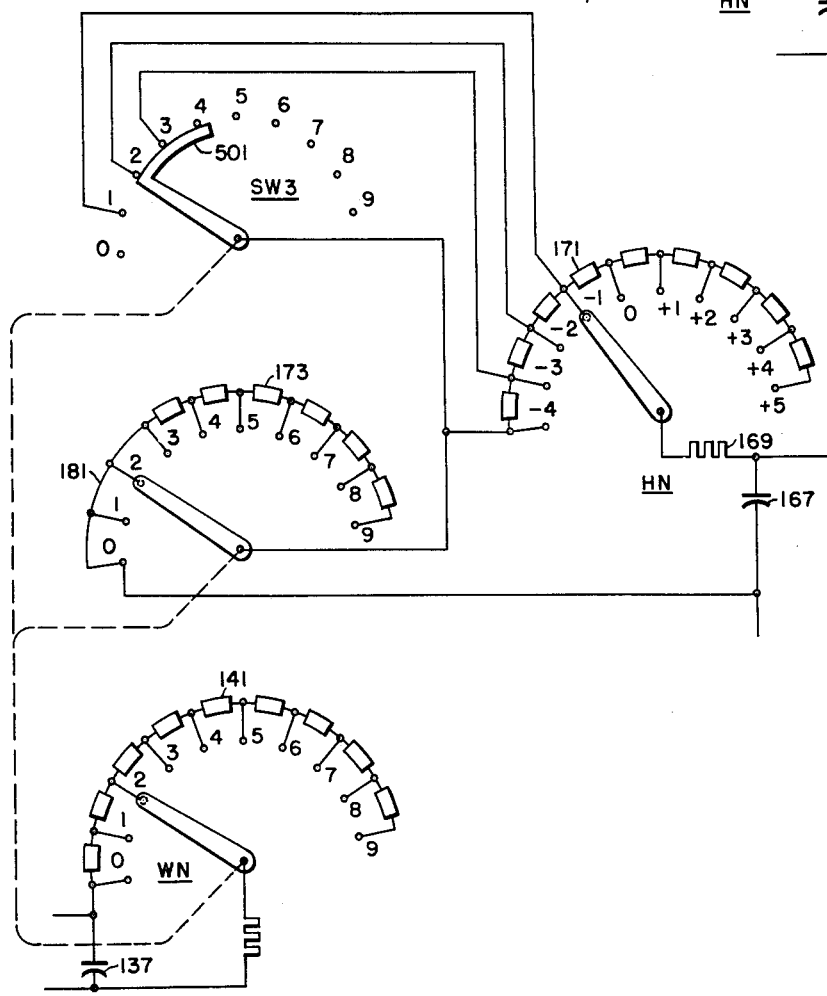
INVENTORS
Hubert W. VanNess
& William E. Large
BY
ATTORNEY

United States Patent Office 2,977,529
Patented Mar. 28, 1961

2,977,529

ELECTRIC DISCHARGE APPARATUS

Hubert W. Van Ness, Walnut Creek, Calif., and William E. Large, Lancaster, N.Y., assignors to Westinghouse Electric Corporation, East Pittsburgh, Pa., a corporation of Pennsylvania Original application Feb. 28, 1955, Ser. No. 490,871, now Patent No. 2,953,678, dated Sept. 20, 1960. Divided and this application Oct. 20, 1958, Ser. No. 768,346

5 Claims. (Cl. 323—74)

Our invention relates to electric discharge apparatus and has particular relation to such apparatus for controlling the operation of an electric resistance welding system. This application is a division of application Serial No. 490,871, filed February 28, 1955, now Patent No. 2,953,678 and assigned to Westinghouse Electric Corporation. In certain of its aspects, this application, like its parent, relates to Patent 2,845,531, granted July 29, 1958; Patent 2,862,151, granted November 25, 1958; and Patent 2,802,146, granted August 6, 1957, all to Hubert W. Van Ness, and to our Patent 2,840,686 granted June 24, 1958, all assigned to Westinghouse Electric Coporation, and the above-mentioned application and patents are incorporated in this application by reference.

The welding systems with which our invention concerns itself may be divided into a number of units: a welder or welding machine for engaging the work in a position to be welded, a power supply unit for supplying the welding current to the welder, a solenoid actuating unit for energizing and deenergizing the solenoid of the valve which controls the engagement and the disengagement of the welding electrodes from the work, and a sequence timer for initiating and timing the various functions of the welder; that is, the engagement of the welding electrodes with the work, called squeeze, the transmission of welding current, called weld, the holding of the electrodes in engagement with the work and subsequent disengagement of the electrodes from the work, called hold, and the resetting called off. A complete operation as described above is called a welding cycle, and each of the functions is called a phase of a welding cycle. The sequence timer includes a circuit, usually called a sequence initiation circuit, for starting the sequence at the beginning of a welding cycle. The sequence initiation circuit usually includes a relay which closes a contact to start the sequence.

In the operation of welding apparatus, particularly in the automotive field, it is customary to produce a large number of welds without interruption. Under such circumstances, the sequence initiation circuit is closed and the sequence timer, and with it the welding apparatus, repeatedly passes through a large number of welding cycles. In welding apparatus, in accordance with the teachings of the prior art of which we are aware, the sequence initiation circuit is of such structure and is so tied into the sequence timer that when the sequence timer is in repeat operation producing a large number of welds without interruption, the starting relay is actuated at the beginning of each welding cycle. We have found that this repeated operation of the starting relay of prior art apparatus markedly deteriorates the relay, and it is an object of our invention to provide a sequence timer including a sequence initiation circuit in which the starting relay shall not operate repeatedly when the sequence timer is in repeat operation.

It is also desirable in the interest of safety to provide a sequence initiation circuit in which the parts to be actuated by the operator are subjected only to a low voltage of the order of 20 or 30 volts. Sequence timers in accordance with the teachings of the prior art, including a low voltage sequence initiation circuit, have been of complex and costly structure, and it is another object of our invention to provide a low voltage sequence initiation circuit of simple structure.

The automotive industry in its effort to reduce costs has imposed on welding apparatus the demand that it operate at a high speed. This demand is particularly urgent in the case of gun welders, which it is desired shall produce welds at a rate of as high as 600 per minute. Electronic circuits are available for transmitting signals at rates as high as 600 per minute or even higher, but the availability of such signals from a sequence timer, for example, is not in itself sufficient to product welds at a high speed. The difficulty resides in the fact that the mechanical components of the guns are not capable of responding instantaneously to signals received from the sequence timer. The practice has then developed in the welding art of transmitting the signals from the sequence timer to the welder so that they anticipate the desired operation of the welder. Specifically, the pratice has developed of transmitting a signal to the solenoid actuating unit of welding apparatus which starts the disengagement of the electrodes from the work before the welding time has elapsed. In accordance with this practice, the hold interval times out before the weld interval, so that before the welding current stops flowing, the electrodes start disengaging the work. The difference between the weld time and the hold time in such operation is called negative hold time. With the concept of negative hold time, a new concept electrode-closed time was introduced to describe the time interval during which the solenoid of the welding apparatus is energized by the solenoid actuating unit. The sequence timers of high speed welding apparatus of the prior art then includes a squeeze component, an electrode-closed time component, a weld component and an off component, and suitably calibrated dials are provided for setting each of the components. In producing welds at a high speed, the squeeze and the electrode-closed time intervals are initiated simultaneously, and the weld interval is initiated after the squeeze interval. The negative hold time in such apparatus is equal to the sum of the squeeze and the weld intervals less the electrode-closed time interval. The operator of such apparatus usually desires to set this apparatus for a certain negative hold time, but he cannot make this setting directly by referring to a scale; he must set the squeeze and weld time and the electrode-closed time so that squeeze plus weld less electrode-closed time is the desired negative hold time. There is a tendency to perform this mental operation incorrectly particularly when a changeover is to be made without delay, and it has been found to lead to improper operation of the apparatus.

It is, accordingly, a further object of our invention to provide high speed welding apparatus having facilities for readily setting the negative hold time.

The materials which are welded, particularly in the automotive industry, are of relatively high cost, and it is desirable that every effort be made to minimize loss of material. For this reason, it is another demand of industry, and particularly of the automotive industry, that the welding be stopped promptly, even in the middle of a series of welds, in the event of failure of a critical component, particularly a critical discharge device. The provision for accomplishing this object is called the weld safe provision. The portion of the welding apparatus which is involved in the weld safe provision is usually the discharge device which terminates the flow of welding current and its associated circuit. It is recognized that if the flow of welding current is promptly stopped in the event of a defect in the apparatus, damage to the material can, to a large extent, be avoided.

Weld safe provisions have been included in low speed welding apparatus, but the practice developed in the case of low speed welding apparatus is not applicable to high speed welding apparatus, and it is a further object of our invention to provide high speed welding apparatus including weld safe facilities which operate effectively regardless of whether the apparatus is set for positive or negative hold time.

It is further broadly an object of our invention to provide a novel sequence timer for high speed welding.

It is an ancillary object of our invention to provide a novel electronic circuit particularly suitable for use in a sequence timer for a high speed welding system.

Another ancillary object of our invention is to provide a novel electronic circuit particularly suitable for use in a solenoid actuating unit having an alternating current solenoid.

In accordance with one aspect of our invention, we provide a sequence initiating circuit for a sequence timer including a transformer having a low voltage primary and a higher voltage secondary. The manually actuable switch for starting the sequence is connected to close the primary circuit. The starting relay is connected to be energized when voltage appears across the secondary. Once this relay energizes, it closes a circuit which maintains it energized independently of the starting switch but which opens at the end of each welding cycle and, thus, if the switch is opened after a welding cycle has been started but before it is terminated, the relay remains actuated. On the other hand, so long as the manual switch remains closed, the relay remains actuated. Thus, when the apparatus is used to produce a large number of welds continuously and the starting switch remains closed during the whole operation, the relay remains closed. The wear and tear on the starting relay by its reopening repeatedly when a large number of welds are being produced without interruption is thus avoided.

In accordance with a further aspect of our invention, we dispense with the electrode-closed time, and we provide a sequence timer which, instead of having an electrode-closed time component which is operated simultaneously with the squeeze component, has a hold component, the timing out of which may be started simultaneously with the timing out of the weld component. If the hold time is to be negative, the hold component may be set to time out before the weld component. This setting is facilitated by providing an auxiliary variable resistor in the hold network which has blank settings at the low end of its range to correspond to the negative hold settings. The adjustable arm of this variable resistor is ganged with the adjustable arm of the variable resistor in the weld network, so that resistance is added by it in the hold network only when the variable resistor in the weld network is set for a higher weld interval than the maximum negative hold time. Under these circumstances, the hold time, whether it is positive or negative, is set by the main variable resistor in the hold network, and this resistor may be marked to indicate without any calculation the duration of the negative hold time.

When the weld network of the just-described apparatus is set for a weld time of less than the maximum negative hold time, it affects the negative hold time setting so that the latter may be no greater than the weld time setting. In accordance with a further aspect of our invention, we provide means for assuring that the negative hold time is independent of the weld time setting even if the latter is less than the maximum negative hold time.

Another aspect of our invention involves the weld safe feature. In accordance with this aspect of our invention, we provide a sequence timer having a weld component including a discharge device which is rendered conducting to initiate and maintain the flow of welding current. In addition, we provide a pair of discharge devices both connected to the discharge device of the weld component in such manner that if either of the devices is rendered conducting, the weld discharge device is rendered nonconducting and the flow of welding current is terminated. The sequence timer also includes a hold component and an off component, and the two discharge devices which terminate the weld time are so interconnected with the hold component and the off component that off timing is started only after the hold component has timed out and then only if both of the discharge devices which terminate the weld time are conducting. Thus, if only one of the discharge devices is conducting, the weld time is terminated but the off time is not initiated so that the starting of a new welding cycle is prevented. In addition, the cycling operation following the weld time is started after the hold component has timed out, and, thus, it is immaterial whether the apparatus is operating with a positive or a negative hold time.

In accordance with a still further aspect of our invention, we provide a solenoid actuating unit including a pair of discharge devices which are so interconnected that the operation of the unit may be started from an external signal and when once started, it continues independently of this external signal until stopped by a second external signal. This object is achieved with a circuit in which each of the discharge devices is provided with blocking bias which is maintained by the open circuit potential across the other device. If one of the other devices is now rendered conducting, the blocking bias in the other is suppressed, which in turn suppresses the blocking bias of the first to be rendered conducting and thus the two discharge devices mutually maintain each other conducting.

The novel features characteristic of our invention are disclosed generally above. The invention itself, both as to its organization and method of operation, together with additional objects and advantages thereof, will be understood from the following description of specific embodiments thereof taken in connection with the accompanying drawings, in which:

Figures 1A and 1B together constitute a circuit diagram of a preferred embodiment of our invention.

Fig. 2 is a fragmentary circuit diagram showing a portion of the hold network of the embodiment of our invention shown in Figs. 1A and 1B; and Fig. 3 is a fragmentary circuit diagram showing portions of the weld and hold networks of a modification of our invention.

Description Figs. 1A and 1B

The apparatus shown in Figs. 1A and 1B includes a Welder, a Power Supply Unit, a Solenoid Actuating Unit, and a Sequence Timer. This apparatus is supplied with power from main conductors or buses L1 and L2, which may be connected to the buses of a commercial supply of 220 or 440, or any other commercial voltage. Since the Sequence Timer usually operates at a different voltage than that supplied by the conductors L1 and L2, it is energized from separate conductors AL1, AL2, AL3 and DL1 and DL2, which derive their power from the conductors L1 and L2 through a transformer T1 having a secondary S1 with an intermediate terminal. The conductors AL1 and AL3 are connected to the end terminals of the secondary S1 and the conductor AL2 to the intermediate terminal. The potential between conductors AL1 and AL2 is then in opposite phase to the potential between conductors AL3 and AL2. The conductors DL1 and DL2 supply direct current potential of the half-wave type. These conductors are connected, respectively, to conductors AL1 and AL3 through rectifiers 3 and 5.

The Welder includes a welding transformer T having a primary P and a secondary S. Welding electrodes E1 and E2 are connected across the secondary S. The electrode E2 is actuable by fluid pressure and when so actuated, work W between electrodes E1 and E2 is firmly engaged and subjected to pressure applied to electrode E2.

The Welder also includes the usual fluid line FL, the flow of fluid of which is controlled by a valve V which is normally closed and may be opened by energizing a solenoid VS. The solenoid VS is connected to the Solenoid Actuating Unit and is controlled from the latter. The Welder includes a pressure switch SP which is closed in the Sequence Timer when the pressure between the electrodes E1 and E2 and the work W is adequate for welding.

The Power Supply Unit may be of any suitable type, but is specifically shown as an ignitron contractor. This unit includes a pair of ignitrons I–1 and I–2, each of which has an anode 11, a cathode 13, and an igniter 15. The anodes 11 and the cathodes 13 of the ignitrons I–1 and I–2 are connected in inverse parallel between the conductor L2 and one of the terminals of the primary P of the welding transformer. The other terminal of the primary P is connected to the conductor L1. When the ignitrons I–1 and I–2 are rendered conducting, they supply alternating current through the primary P.

The ignitrons I–1 and I–2 are controlled by a weld relay RW of the sequence timer. This relay RW has a normally open contact 17. Between the cathode 13 and the igniter 15 of each of the ignitrons I–1 and I–2, a pair of rectifiers 19 and 21 and 23 and 25, respectively, are so poled as to conduct positive current from the cathode 13 to the igniter 15. By positive current we mean the flow of ions or so called holes; such ions or holes flow in a direction opposite to the flow of electrons. The normally open contact 17 is connected between the junction of the rectifiers, and when this contact is closed, firing current flows through a rectifier 19 and 25 or 23 and 21, and an igniter of each of the sets and an associated ignitron I–1 or I–2 is rendered conducting. The firing current flows at the beginning of a succession of half periods of the supply so that when the contact is closed the ignitrons I–1 and I–2 supply alternating current to the primary P.

The Solenoid Actuating Unit includes a pair of electric discharge devices, preferably thyratrons SUT1 and SUT2. Each thyratron has an anode 31, a cathode 33 and a control electrode 35. The anodes 31 and cathodes 33 of the thyratrons SUT1 and SUT2 are connected in inverse parallel in series with the solenoid VS between the conductors L1 and L2. Thus, when the thyratrons SUT1 and SUT2 are conducting, the solenoid VS is energized.

Thyratron SUT1 is supplied with composite control potential made up of three independent components. One of these is derived from a blocking bias network AN1 consisting of a capacitor 37 shunted by a resistor 39. This network AN1 is connected between the control electrode 35 and the cathode 33 of thyratron SUT1 through a grid resistor 41, a resistor 43 across which additional blocking bias is impressed from the Sequence Timer, and a resistor 45 across which counteracting potential is impressed from the Sequence Timer. The terminal of the network AN1 connected to the cathode 33 of thyratron SUT1 is also connected directly to the anode 31 of thyratron SUT2. The other terminal of the network AN1 is connected through a current limiting resistor 47 and a rectifier 49 to the cathode of thyratron SUT2. The rectifier 49 is poled to conduct positive current from the network to the cathode. A resistor 51 is connected between the rectifier 49 and the terminal of the network AN1 which is connected to the anode of thyratron SUT2. It is seen that the network AN1 is so connected between the anode 31 and the cathode 33 of thyratron SUT2 that it is charged in a sense to block conduction of thyratron SUT1 by the open circuit potential across the thyratron SUT2. It follows that when thyratron SUT2 is conducting, the network AN1 is substantially uncharged.

Thyratron SUT2 is controlled only from a network AN2. This network also includes a capacitor 57 shunted by a resistor 54 and is connected between the control electrode 35 and the cathode 33 of thyratron SUT2 through a grid resistor 61. The terminal of the network AN2 connected to the cathode 33 is also connected to the anode 31 of thyratron SUT1. The other terminal is connected to the cathode of thyratron SUT1 through a current limiting resistor 63 and a rectifier 65 poled to conduct positive current from the network AN2 to the cathode 31. A resistor 67 is connected between the rectifier 65 and the terminal of the network AN2 connected to the cathode of thyratron SUT2. Network AN2 is thus charged to a blocking magnitude by the open circuit potential across the thyratron SUT1 and is substantially uncharged when the latter thyratron SUT1 is conducting.

In accordance with the broader aspects of our invention, the Sequence Timer may be of any type known in the art, such for example, as the timers shown in Patents 2,862,151 and 2,802,406 mentioned above, but specifically the Sequence Timer is an adaptation of the timer shown in the above-mentioned Patent 2,845,331.

The Sequence Timer includes a low voltage sequence initiation circuit, a plurality of thyratrons including an off thyratron OT, a squeeze thyratron ST, weld thyratrons WT1, WT2, and a hold thyratron HT for controlling the various functions of the Welder; a plurality of networks including the off network ON, the squeeze network SN, the weld network WN, and the hold network HN for timing the various functions of the Welder. The Sequence Timer also includes a plurality of auxiliary thyratrons AT1, AT2 and AT3 for producing transitional operations of the sequence timer and a plurality of auxiliary networks AN3, AN4, AN5 and AN6. The Sequence Timer further includes a start switch SS, a start relay RS, the weld relay RW, a repeat-non-repeat switch SW1 and a switch SW2 for setting the apparatus either for positive hold during low-speed welding or for negative hold during high-speed welding. The switch SS may be the foot switch of a press welder or the trigger of a gun welder.

The sequence initiation circuit includes a transformer LT having a low-voltage primary LP and a higher voltage secondary LS. The transformer LT is designed to supply the higher voltage across the secondary LS which is necessary for the operation of the relay RS with a potential of the order of twenty-four volts across the primary LP. The sequence initiation circuit is energized from a transformer T2 having a primary connected across the conductors AL1 and AL2, the secondary S2 of this transformer supplies a low voltage of the order of twenty-four volts. The primary LP and the secondary S2 are connected in a normally open series circuit through the start switch SS.

The higher voltage secondary LS is connected across the coil of the starting relay RS through a rectifier 71 poled to conduct positive current from the coil of the relay to the secondary LS. The relay RS has a normally open contact 73 which, when closed, connects a conductor AL4 to the conductor AL2. Since the coil of relay RS draws only half-wave current through the rectifier, it may be desirable to connect across this relay a rectifier 75. The rectifier 75 is poled to conduct current in a direction opposite to the direction of the energizing current through the coil.

The sequence initiation circuit cooperates with the off thyratron OT which has an anode 81, a cathode 83 and a control electrode 85. The anode 81 of thyratron OT is connected to the conductor DL1 through the primary AP1 of a transformer AZ1. The cathode 83 is connected to the conductor AL4. The anode of thyratron OT is also connected through another rectifier 87 to the junction of the coil of relay RS and the rectifier 71 in series with it and the secondary LS. The rectifier 87 connected to the anode 81 of thyratron OT is poled to conduct positive current in a direction opposite to the rectifier 75 connected between the coil and the secondary LS.

The secondary AS1 of the transformer AZ1 is connected across the resistor 45 in the control circuit of thyratron SUT1 through resistor 91 and rectifier 87, and when current is conducted by primary AP1 of transformer AZ1, a potential is impressed across the resistor 45 which counteracts the blocking potential impressed by the network AN1.

The off network ON includes a capacitor 97 shunted by a fixed resistor 99 and a variable resistor 101. The variable resistor 101 may be shunted out by a contact 103 of the repeat-non-repeat switch SW1 when the latter is in the non-repeat position. Under such circumstances, the capacitor 97 may be discharged in a short interval of the order of a period of the supply. The off network ON is connected between the control electrode 85 of the thyratron OT and the conductor AL2, through a grid resistor 105 and the secondary AS2 of another transformer AZ2. A resistor 107 and a rectifier 109 are connected between conductors AL1 and AL2 and have a junction J1. Junction J1 is adapted to be connected to the anode 81 through the pressure switch SP.

The squeeze thyratron ST has an anode 115, a cathode 113 and a control electrode 111. The squeeze network SN includes a capacitor 117 shunted by a fixed resistor 119 and a variable resistor 121. The anode of thyratron ST is connected to conductor DL2 through the primary AP3 of a transformer AZ3. The cathode 113 is connected to conductor AL2. The control electrode 111 of thyratron ST is connected to the junction J1 through a grid resistor 123 and the squeeze network SN. As is explained in the application, Serial No. 424,094, and the applications to which it relates the purpose of the connection to the junction J1 is to reduce the negative potential on the control electrode 111 of thyratron ST when it is being rendered non-conducting and thus to prevent gas clean-up in this thyratron.

The weld thyratrons WT1 and WT2 are similar. Each has an anode 131, a cathode 133 and a control electrode 135. The network WN consists of a capacitor 137 shunted by a fixed resistor 139 and variable resistor 141. The anode 131 of thyratron WT1 is connected to conductor DL1 through the primary AP4 of a transformer AZ4. The cathode 133 is connected to the conductor AL4. The anode 131 of the thyratron WT2 is connected to the conductor DL1 through the primary AP5 of a transformer AZ5. The cathode 133 is connected to the conductor AL2. Control potential for the thyratrons WT1 and WT2 is derived from the junction J2 of a rectifier 143 and a resistor 145 connected between the conductors AL3 and AL2. The junction J2 is connected to the control electrode 135 through a grid resistor 147 and the network WN. The junction J2 is also connected to the anode 115 of the squeeze thyratron ST. Between the anodes of the thyratrons WT1 and WT2 and a junction J3 a pair of rectifiers 149 and 151 are connected, each rectifier being poled to conduct positive current from its associated anode to the junction J3.

The hold thyratron HT has an anode 161, a cathode 163, and a control electrode 165. The hold network HN includes a capacitor 167 shunted by a fixed resistor 169, a variable resistor 171, an additional variable resistor 173 which may be shunted out by a contact 175 of the negative hold switch SW2 when the latter is set for positive hold. The resistor 171 may be of the type shown in Fig. 2 which has a scale marked near the low resistance end for negative hold.

It is now desirable to digress for the purpose of describing the components of the weld and hold networks WN and HN and their relationship. The adjustable arm 177 of the latter variable resistor 173 is ganged with the adjustable arm 179 of the variable resistor 141 in the weld network WN. The low resistance portion 181 of the variable resistor 173 in the hold network HN is short circuited out over the range corresponding to the maximum negative hold time which it is desired be used. Thus, assume, for example, that the capacitor 167 and the variable resistors 171 and 173 are so related that 10,000 ohms in the network HN correspond to a time interval of one full period, and that the maximum negative hold time is four periods. Under such circumstances, the first 40,000 ohms from the zero ohm terminal of the variable resistor 171 is shorted out.

In the negative hold setting of the Sequence Timer, the adjustable arm 177 of the variable resistor 173 adds no resistance in the hold network HN while this arm and the arm of the variable resistor 141 in the weld network are moving from a point corresponding to zero weld time to a point corresponding to four periods weld time. The negative hold time may then be set by setting the other variable resistor 171 in the hold network HN, the setting near the lower portion of its range corresponding to negative hold time and the settings in the remaining portion of its range corresponding to positive hold time as shown in Fig. 2. When the variable resistor 141 in the weld network WN is set for higher weld time than the maximum negative hold time, the variable resistor 173 in the hold network HN ganged with the resistor 141 adds resistance in the hold network HN corresponding to that added in the weld network, and thus, the setting of the other variable resistor 171 in the hold network still determines the magnitude of the negative or positive hold time. Thus, assume that the variable resistor 141 in the weld network WN is set for six periods weld time and the variable resistor 171 in the hold network HN is set for minus two periods hold time. The ganged variable resistor 173 in the hold network HN is then set for two periods hold time so that the total hold time in the hold network HN is four periods, and this is two periods less than the setting of the weld network WN so that the negative hold time is two periods.

The anode 161 of the hold thyratron HT is connected to the conducter DL1 through the primary AP6 of a transformer AZ6. The cathode 163 is connected to the conductor AL4. The secondary AS6 of the transformer AZ6 is connected across the resistor 43 in the control circuit of thyratron SUT1 in such a sense that when current flows through the primary AP6, a potential, such as to block the conduction of the thyratron SUT1 is impressed across this resistor 43. The junction J3 and the anode 161 are connected to a junction J4 through a pair of rectifiers 185 and 187, respectively, each poled to conduct positive current to the junction J4. The anode 161 is also connected to the junction J6 of a resistor 188 and a rectifier 190 connected between conductor AL1 and conductor AL2. Control potential for the thyratron HT is derived either through a contact 189 of the negative hold switch SW2 from the junction J5 of a resistor 191 and a rectifier 193 connected between the conductors AL3 and AL2 or from the junction J2 if the switch SW2 is in the negative hold position. The junction J5 or J2 is connected to the control electrode 165 through the contact 189 of the switch SW2, through the hold network HN and through a grid resistor 195.

The thyratron AT1 has an anode 201, a cathode 203 and a control electrode 205. The network AN3 consists of a capacitor 207 shunted by a resistor 209. The network AN4 consists of a capacitor 217 shunted by a pair of resistors 219 and 221. Across the network AN3, the secondaries AS4 and AS5 of the transformers AZ4 and AZ5 are connected in series through a rectifier 223. The network AN4 is connected between the conductor AL3 and the conductor AL2 through a rectifier 225 poled to conduct positive current from the conductor AL2 to the conductor AL3.

The anode 201 of thyratron AT1 is connected to the conductor AL3 through the coil of the relay RW. The cathode 203 is connected to the conductor AL2. The control electrode 205 of thyratron AT1 is connected through a grid resistor 225, the network AN3, the secondary AS3 of the transformer AZ3 and the network AN4 to the conductor AL2. In this circuit the network AN4 is charged to such a potential as normally to block the conduction of thyratron AT1. The secondary AS3 is so connected that when the thyratron ST conducts, potential is impressed through the secondary AS3 to counteract the blocking potential of the network AN4. The primaries AS4 and AS5 are so connected that when either thyratron WT1 or thyratron WT2 conducts or both conduct, sufficient potential is impressed across the network AN3 to block the conduction of thyratron AT1 even if potential is available across the secondary AS3.

The thyratron AT2 has an anode 231, a cathode 233 and a control electrode 235. The network AN5 consists of a capacitor 237 shunted by a resistor 239, the relationship between the capacitor 237 and the resistor 239 being such that the capacitor when charged and permitted to discharge, discharges substantially in a time interval of the order of one period of the supply. The anode 231 of thyratron AT2 is connected to the conductor DL2 through a reactance 241 sufficient to produce carry-over in the conduction of thyratron AT2. The cathode 233 is connected to the conductor AL2. The control electrode is connected through a grid resistor 245 and the network AN5 to the junction J3.

Thyratron AT3 includes an anode 251, a cathode 253 and a control electrode 255. Network AN6 includes a capacitor 257 shunted by a resistor 259 and has a time constant similar to network AN5. The anode 251 of thyratron AT3 is connected to conductor DL2 through the primary AP2 of the transformer AZ2. The cathode 253 is connected to conductor AL2. The control electrode 255 is connected through a grid resistor 261 and network AN6 to the junction J4.

Stand-by—Figs. 1A and 1B

In the stand-by condition of the apparatus, the disconnects or circuit breakers (not shown) for the apparatus are closed and conductors L1 and L2 are energized. Power is then supplied to the apparatus and the cathodes of the various thyratrons are heated so that they can conduct if proper potential is applied to them. The start switch SS is open and there is no potential across the secondary LS and relay RS is deenergized so that the connection between conductors AL2 and AL4 is broken. Thyratrons OT, WT1 and HT are then non-conducting and transformers AZ1, AZ4, AZ5 and AZ6 are deenergized. There is then no potential across secondary AS3 and networks AN1 and AN2 become charged by the open circuit potential across the thyratrons SUT2 and SUT1 and these thyratrons are non-conducting. The valve solenoid VS is then deenergized, the valve V is closed and the electrode E2 is retracted from electrode E1.

During the half periods when conductor AL1 is positive relative to conductor AL2, network SN is charged by grid conduction through thyratron ST. During the other half periods the charge on this network maintains thyratron ST non-conducting. Transformer AZ3 is then deenergized and thyratron AT1 is non-conducting. Relay WT is deenergized and ignitrons I–1 and I–2 are non-conducting.

The network WN is similarly charged by grid conduction through thyratron WT2 during the half periods during which the conductor AL3 is positive relative to conductor AL2. Thyratron WT2 is then also non-conducting.

Network HN is connected at one terminal to conductor AL3 either through junction J2 or through junction J5, depending on the position of the negative hold switch SW2. It is connected at the other terminal to the control electrode of thyratron, but since the cathode return of this thyratron is connected to the open conductor AL4, there is no potential impressed across network HN. The network is then uncharged. Thyratron HT is, however, non-conducting because its cathode return circuit is open.

Network AN6 is connected to the junction J6 through junction J4 and the rectifier 187 to the other terminal between the control electrode and the cathode. This network is then charged so as to maintain thyratron AT3 non-conducting when conductor AL1 is positive relative to conductor AL2. With thyratron AT3 non-conducting, transformer AZ2 is deenergized, network ON is discharged and thyratron OT, while non-conducting because its cathode return is open at contact 73, is ready to conduct immediately on the closing of this cathode return.

Operation Figs. 1A and 1B—Repeat—Positive hold

The operation of the apparatus shown in Figs. 1A and 1B will now be explained with the repeat-non-repeat switch SW1 set for repeat and the switch SW2 set for positive hold, that is, in the position shown in the drawings. Since the switch SW1 is set for repeat, the apparatus will be described on the assumption that a plurality of welds are to be produced.

To produce a plurality of welds, the work W is disposed on electrode E1 and the start switch SS is closed. The low voltage primary LP is then energized and potential is supplied to the secondary LS. Current then flows through the coil of the start relay RS and the latter picks up, connecting conductor AL4 to the energized conductor AL2. Current then immediately flows through thyratron OT. This current flow has two parallel paths, one through the primary AP1 and the other through the relay RS. The relay RS is then maintained actuated through thyratron OT so long as it remains conducting. The relay RS is also maintained actuated by the current derived from the primary LS so long as the switch SS remains closed. Thus, once the thyratron OT is rendered conducting, the relay RS remains actuated regardless of whether or not the operator opens the switch SS and the apparatus has the so-called non-beat property, that is, a welding cycle can not be interrupted before it has been completed. On the other hand, during repeat welding, the switch SS remains closed for the whole series of welds and the relay RS remains actuated and does not repeatedly open and reclose as the thyratron OT becomes conducting and non-conducting.

The closing of the contact of relay RS also completes the anode-cathode circuit for thyratron HT. The network HN in the control circuit of thyratron HT is uncharged, but unlike thyratron OT, thyratron HT is not rendered conducting. This can be understood by considering the relationship of the control and anode potentials on thyratron HT under the alternative conditions which might exist on the closing of the contact 73 of the relay RS, that is, when at the instant when the contact 73 closes the conductor AL1, and the conductor DL1, is positive relative to the conductor AL2, and when the conductor AL3 is positive relative to the conductor AL2. In the case of the first alternative, thyratron HT does not conduct because its control electrode is connected through the uncharged network HN to the conductor AL3 which is, at the time, highly negative with respect to conductor AL4 and the cathode 163. In the case of the second alternative, thyratron HT can not conduct because there is a negative potential impressed between its anode and its cathode, but the network HN is charged to its timing potential by grid current flowing through thyratron HT under the potential difference between conductor AL3 and conductor AL2.

On the supply of current through the primary AP1, potential appears across the secondary AS1 and across the resistor 45 in the control circuit of thyratron SUT1. Thyratron SUT1 is then rendered conducting and a half cycle of current flows through the solenoid VS. On the conduction of thyratron SUT1 the charge delivered to the network AN2 during the half period during which thyratron SUT1 conducts is small. The magnitude of resistor 54 is such that the network discharges sufficiently to permit thyratron SUT2 to conduct when the anode-cathode potential of the latter becomes positive. Another half cycle of current now flows through the solenoid VS. Since thyratron SUT2 is conducting during this last half period, network AN1 accumulates only a very small charge and permits thyratron SUT1 to conduct again during the succeeding half period independently of any potential on transformer AZ1. Thyratron SUT1 then conducts again. This conduction of thyratrons SUT1 and SUT2 in succession now continues, each permitting the other to conduct, and current flows through the solenoid VS and the valve V is opened, causing the electrode E2 to engage the work W1. When adequate pressure has been applied to the electrode E2, the switch SP is closed.

The closing of the switch SP connects the anode of thyratron OT to the junction J1, reducing the potential for charging the squeeze network SN and permitting it to discharge. When network SN has timed out, squeeze thyratron ST is rendered conducting, supplying current through the primary AP3. Potential appears across the secondary AS3, and this potential counteracts the blocking potential impressed by the network AN4, and thyratron AT1 is rendered conducting.

Relay RW is then energized to close the welding contact 17 through the starting circuits of ignitrons I–1 and I–2 and the latter conduct. Current now flows through the primary P and as a result through the work W to produce the desired weld.

The conduction of thyratron ST also reduces the charging potential for the network WN and the latter discharges. The network WN is set so that the weld interval persists for a sufficient time to provide a sound weld. When network WN times out, thyratrons WT1 and WT2 conduct. If these thyratrons and their circuit is in proper operating condition, both thyratrons WT1 and WT2 will conduct. Under the circumstances, both transformers AZ4 and AZ5 are energized and potential is impressed across network AN3 to counterbalance the potential impressed by secondary AS3. Thyratron AT1 is then again rendered non-conducting, the weld relay RW is deenergized and the flow of current through the welding transformer T and through the work W is interrupted. The potential impressed across the secondaries AS4 and AS5 is such that even if one of the thyratrons WT1 or WT2 does not conduct, the thyratron AT1 is still rendered non-conducting to stop the weld. Thus, if there is defect in the apparatus, the flow of welding current is positively interrupted, and there is no damage to the apparatus.

The two alternative conditions: one, that WT1 and WT2 are both conducting and the other, that WT1 or WT2 is conducting, need now be considered. If both WT1 and WT2 are conducting, the potential for charging network AN5 through junction J3 is reduced and the network AN5 discharges, permitting thyratron AT2 to conduct. The conduction of thyratron AT2 reduces the charging potential for network HN and the latter is permitted to discharge continuing the sequence. If only thyratron WT1 or thyratron WT2 is conducting, there is charging potential supplied to junction J3 through the rectifier 149 or 151 connected to the anode 131 of the non-conducting thyratron. Network AN5 then remains charged, and thyratron AT2 remains non-conducting. Network HN then remains charged and the continuation of the sequence is interrupted until the apparatus is repaired.

Now the explanation of the sequence may be continued, assuming that thyratrons WT1 and WT2 are both conducting. Under such circumstances, network AN5 discharges rendering thyratron AT2 conducting and the hold network HN discharges, and when this network has timed out, thyratron HT is rendered conducting. Transformer AZ6 is now energized and potential appears across the secondary AS6 and across the resistor 43 in the control circuit of thyratron SUT1. This potential is so poled as to impress a blocking potential on thyratron SUT1, to render it non-conducting. Once thyratron SUT1 is rendered non-conducting during a half period, the network AN2 is charged during the same half period to block thyratron SUT2, which in turn, permits the network AN1 to charge to block thyratron SUT1. The flow of current through the solenoid VS is then interrupted, the valve V is closed and the electrode E2 is permitted to retract from the work W and switch SP is opened. The network HN is usually set so that it times out only after the weld has solidified.

In addition, the potential at junction J4 is now reduced, and this, in turn, reduces the charging potential for network AN6. The latter discharges so as to permit thyratron AT3 to conduct in a time interval of the order of one period of the supply. The conduction of thyratron AT3 energizes transformer AZ2 and network ON is charged. The charging of network ON impresses a blocking potential on thyratron OT and the latter is rendered non-conducting. If the start switch SS is held closed, as it would be during a repeat operation, this does not affect the relay RS which remains closed because of the potential impressed across the secondary LS.

The junction J1 is raised in potential either by the non-conduction of the thyratron OT or the opening of switch SP whichever occurs first and network SN is charged. The charging of network SN renders thyratron ST non-conducting and transformer AZ3 is deenergized, removing the potential across secondary AS3. This has no immediate effect since thyratron AT1 is maintained non-conducting by the potential impressed by transformers AZ4 and AZ5.

But the non-conduction of thyratron ST has another effect, it provides charging potential for network WN which immediately charges to render thyratrons WT1 and WT2 non-conducting. Transformers AZ4 and AZ5 are then deenergized, but this has no immediate effect because transformer AZ3 is already deenergized and network AN4 is effective to maintain thyratron AT1 non-conducting.

The non-conduction of thyratrons WT1 and WT2 provides charging potential for network AN5 which immediately charges, rendering thyratron AT2 non-conducting. The non-conduction of this thyratron provides charging potential for network HN rendering thyratron HT non-conducting. The supply of potential through secondary AS6 to the control circuit of thyratron SUT1 is now interrupted, but thyratron SUT1 remains non-conducting because there is no energizing potential available across secondary AS1, thyratron OT being non-conducting.

The non-conduction of thyratron HT provides charging potential for network AN6 which immediately charges, rendering thyratron AT3 non-conducting. Transformer AZ2 is now deenergized, permitting network ON to discharge. Network ON discharges during the off interval, giving the operator sufficient time to move the work to the position of the next weld, and then thyratron OT is again rendered conducting to start a second welding cycle. The sequence described above is then repeated. This operation may be continued until the work has been welded.

*Operation Figs. 1A and 1B—Positive hold—non-repeat*

With the switch SW1 set in the non-repeat position, the anode of thyratron AT3 is connected to the weld network WN through a contact 301 of the switch and a rectifier 303 poled to conduct from the network WN to the anode. In addition the network ON is set to time out an interval of the order of a period of the supply.

With the switch SW1 in the non-repeat position, the operation after the closing of the switch SS is the same as with the switch in the repeat position, except that during the first welding cycle, once thyratron AT3 is rendered conducting, it reduces the potential of junction J2 so as to prevent network WN from being charged, and thyratrons WT1 and WT2 are maintained conducting. With thyratrons WT1 and WT2 conducting, thyratron AT2 remains conducting, maintaining network HN uncharged and thyratron HT conducting so that thyratron AT3 is maintained conducting. The conduction of thyratron AT3 also energizes transformer AZ2 so that network ON is charged and thyratron OT remains nonconducting, but this has no effect on the relay RS, and thus, on the thyratrons WT1 and HT so long as switch SS remains closed. To reset the apparatus, the switch SS must be opened, relay RS then becomes deenergized, deenergizing conductor AL4 and permitting thyratron HT to become non-conducting. This, in turn, charges network AN6 causing thyratron AT3 to become nonconducting and resetting thyratrons WT1, WT2 and AT2. The apparatus is now reset for another operation which may be started by reclosing the start switch SS.

*Operation Figs. 1A and 1B—Negative hold—Repeat*

When the apparatus is to be operated at a high speed, the switch SW2 is set for negative hold and the switch SW1 for repeat. In this case, the network HN is connected to junction J2 so that it starts timing out at the same time as the weld network WN. In addition, the network HN is disconnected from the junction J5 so that it is not affected by the conduction or nonconduction of thyratron AT2. Further, the short circuit across the auxiliary variable resistor 173 in the network HN is opened so that it becomes effective and permits the negative hold time to be set alone by the other variable resistor 171.

The operation following the closing of switch SS is the same as for positive-hold-repeat up to the point where thyratron ST is rendered conducting. At this point, thyratron AT1 is rendered conducting, energizing relay RW, which in turn closes the starting circuits through the ignitrons I-1 and I-2 causing welding current to flow through the work. In addition, the timing out of the networks HN and WN starts.

Since the apparatus is set for negative hold, network HN times out first, rendering thyratron HT conducting. Thyratrons SUT1 and SUT2 are then rendered nonconducting to close valve V and permit the electrode E2 to be retracted from the work W. This operation takes a short time interval and during this interval network WN is still timing out and welding current is still flowing.

Network WN actually times out a short time interval after network HN. Thyratrons WT1 and WT2 are then rendered conducting if they and their circuits are in operating condition, and thyratron AT1 is rendered nonconducting, the weld relay RW is deenergized and the flow of welding current is stopped.

If both thyratron WT1 and thyratron WT2 are conducting, network AN6 discharges permitting thyratron AT3 to conduct, the latter charges network On to render thyratron OT nonconducting. By this time the electrode E2 has retracted from the work W and network SN is permitted to charge because the switch SP has opened and thyratron OT has become nonconducting. Thyratron ST then becomes nonconducting, permitting networks WN and HN to recharge to render thyratrons WT1, WT2 and HT nonconducting. Network AN6 then charges, rendering thyratron AT3 nonconducting, permitting network ON to discharge. Thyratron OT is then again rendered conducting to start another welding cycle.

If thyratron WT1 or thyratron WT2 or their circuits are defective, network AN6 remains charged when one or the other of the thyratrons WT1 or WT2 becomes conducting. Thyratron AT3 then remains nonconducting, and thyratron OT conducting, to prevent another weld cycle until the apparatus is repaired.

*Description Fig. 3*

The indicating facilities for the welding system shown in Figs. 1A and 1B is satisfactory when the weld time is set to exceed the maximum negative hold time, but is not entirely satisfactory when the weld time is set for less than the maximum negative hold time. Thus, with reference to the apparatus shown in Figs. 1A and 1B, assume that the maximum negative hold time is four periods and that the weld time is set for five periods. Also assume that three periods negative hold time is desired. Under such circumstances, the resistance in the weld network WN is such that the network times out in five periods. The resistance in the hold network includes one period resistance on the main variable resistor 171 and one period resistance on the auxiliary variable resistor 173. The total then is two period resistance and the hold network HN times out in two periods so that there is a total negative hold time of three periods. Now assume, with reference to Figs. 1A and 1B, that the weld network WN is set for three periods and the main variable resistor 171 in the hold network HN for a negative hold time of three periods. Under such circumstances, the weld network WN has sufficient resistance to time out in three periods but the hold network has resistance corresponding to one period and times out in this one period. The negative hold time is then not three corresponding to the setting but only two.

This deficiency is corrected in the Fig. 3 modification. This modification is similar to the modifications shown in Figs. 1A and 1B, but in addition, includes a switch SW3 ganged with the variable resistor 141 in the weld network WN and the auxiliary variable resistor 173. The switch SW3 with an extended brush or contact 501 short circuits any resistance of the variable resistor 171 in the hold network HN at the beginning of its range which would increase the hold time beyond the weld time setting. In addition in this modification of our invention, the secondary AS3 (Fig. 1A) is so poled as to render thyratron AT1 conducting one period after thyratron ST is rendered conducting so that the timing out of the weld and hold times starts one period before the start of the welding current. The scale of the resistor 141 should then be marked to correspond to the number of periods of actual welding current, that is, the lowest setting of the switch should be labelled zero because at this setting the weld network times out in one period and thus before there is any welding current.

Under such circumstances, when, as in the above example, the weld network WN is set for three periods and the hold network for minus three periods, the total resistance in the weld network WN is such that it times out in four periods and the resistance in the hold network HN corresponding to one period is shorted out by the ganged switch SW3 so that the hold network times one period after the conduction of thyratron ST. But the weld current starts one period after the start of the timing out of the hold network and times out three periods after this. Thus the weld exceeds the hold by three periods as required.

*Conclusion*

From the above description it is seen that we have invented novel welding apparatus for welding either at low speed or at high speed. This apparatus includes a weld safe feature which operates independently of the setting of the apparatus for positive hold time or negative hold time. Our invention also includes certain novel circuit combination which we conceived in arriving at a solution of the broad objects of our invention. While we have described certain specific embodiments of our invention, many modifications thereof are possible. Our invention, therefore, is not to be restricted except insofar as is necessitated by the prior art.

We claim as our invention:

1. In a sequence timer for high speed welding, which timer is capable of being set to operate with a predetermined maximum negative hold time, a weld network including a timing impedance element and a first variable resistor having an adjusting arm cooperative with said element to time weld time, the weld time increasing as the resistance of said first resistor increases, a hold network including in series a second variable resistor and a third variable resistor, each having an adjusting arm, and also including a timing impedance element cooperative with said second and third resistors to time hold time, the hold time increasing as the aggregate resistance of said second and third resistors increases, and means ganging the adjustable arms of said first and second resistors, said arms being adjustable to corresponding settings on said first and second resistors when so ganged, and said second resistor having substantially zero resistance over the range of its resistance corresponding to said predetermined negative hold time.

2. In a sequence timer for high speed welding, which timer is capable of being set to operate with a predetermined maximum negative hold time, a weld network including a timing impedance element and a first variable resistor having an adjusting arm cooperating with said element to time weld time, the weld time increasing as the resistance of said first resistor increases, a hold network including in series a second variable resistor and a third variable resistor, each having an adjusting arm, and also including a timing impedance element cooperative with said second and third resistors to time weld time, the hold time increasing as the aggregate resistance of said second and third resistors increases, means ganging the adjustable arms of said first and second resistors, said arms being adjustable to corresponding settings on said first and second resistors when so ganged, and said second resistor having substantially zero resistance over the range of its resistance corresponding to said predetermined negative hold time, and switch means having an actuating arm ganged with the adjustable arms of said first and second resistors for shunting out resistance in the low resistance range of said third resistor which, when said first and second resistors are set for a time interval less than the maximum negative hold time, corresponds to the magnitude by which said maximum negative hold time exceeds said time interval.

3. In a sequence timer for high speed welding, which timer is capable of being set to operate with a predetermined maximum negative hold time, a weld network including a timing impedance element and a first variable resistor having first means for varying the resistance thereof, the weld time increasing as the resistance of said first resistor increases, a hold network including in series a second variable resistor having second means for varying the resistance thereof and a third variable resistor having third means for varying the resistance thereof, and also including a timing impedance element cooperative with said second and third resistors to time weld time, the hold time increasing as the aggregate resistance of said second and third resistors increases, and means connecting said first and second varying means to operate together to set said first and second resistors in corresponding settings, said second resistor having substantially zero resistance over the range of its resistance corresponding to said predetermined negative hold time.

4. In a sequence timer for high speed welding, which timer is capable of being set to operate with a predetermined maximum negative hold time, a weld network including a timing impedance element and a first variable impedance having first means for varying the impedance thereof cooperative with said element to time weld time, the weld time increasing as the impedance of said first impedance increases, a hold network including in series a second variable impedance having second means for varying the impedance thereof and a third variable impedance having third means for varying the impedance thereof, and also including a timing impedance element cooperative with said second and third impedance to time weld time, the hold time increasing as the aggregate impedance of said second and third impedances increases, and means connecting said first and second varying means to operate together to set said first and second impedances in corresponding settings, said second impedance having substantially zero impedance over the range of its impedance corresponding to said predetermined negative hold time.

5. In a sequence timer for high speed welding, which timer is capable of being set to operate with a predetermined maximum negative hold time, a weld network including a timing impedance element and a first variable impedance having first means for varying said impedance cooperative with said element for timing weld time, the weld time increasing as the impedance of said first impedance increases, a hold network including in series a second variable impedance including second means for varying the impedance thereof and a third variable impedance, including third means for varying the impedance thereof, and also including a timing impedance element cooperative with said second and third impedance to time hold time, the hold time increasing as the aggregate impedance of said second and third impedances increases, means connecting said first and second varying means to operate together to set said second and third impedances to corresponding settings together, said second impedance having substantially zero impedance over the range of its impedance corresponding to said predetermined negative hold time, and switch means connected to said connecting means and operable therewith for shunting out impedance in the low impedance range of said third impedance which, when said first and second impedances are set for a time interval less than the maximum negative hold time, corresponds to the magnitude by which said maximum negative hold time exceeds said time interval.

References Cited in the file of this patent

UNITED STATES PATENTS

| | | |
|---|---|---|
| 2,662,147 | Wilentchik | Dec. 8, 1953 |
| 2,737,343 | Hinton | Mar. 6, 1956 |
| 2,786,122 | Strain | Mar. 19, 1957 |